United States Patent
Fleet

(10) Patent No.: US 6,283,447 B1
(45) Date of Patent: Sep. 4, 2001

(54) MIXING VALVE WITH LIMIT STOP AND PRE-SET

(75) Inventor: Vern Van Fleet, Wolcott, CT (US)

(73) Assignee: Harrow Products, Inc., Woodcliff Lake, NJ (US)

( * ) Notice: Subject to any disclaimer, the term of this patent is extended or adjusted under 35 U.S.C. 154(b) by 0 days.

(21) Appl. No.: 09/549,684

(22) Filed: Apr. 14, 2000

(51) Int. Cl.$^7$ ....................................................... F16K 5/00
(52) U.S. Cl. ............................................ 251/288; 251/285
(58) Field of Search ................................... 251/286, 285, 251/304, 284, 288

(56) References Cited

U.S. PATENT DOCUMENTS

| | | | |
|---|---|---|---|
| 3,964,514 | * | 6/1976 | Manoogian et al. ............. 251/285 X |
| 4,089,347 | * | 5/1978 | Christo ............................. 251/288 X |
| 5,467,967 | * | 11/1995 | Gillooly ............................ 251/285 X |

* cited by examiner

Primary Examiner—Kevin Lee
(74) Attorney, Agent, or Firm—Michael Best & Friedrich LLP

(57) ABSTRACT

A shower valve assembly comprising a handle operably connected to a valve stem of a mixing valve. A limit stop is positioned between the valve stem and the handle to limit the range of motion of the handle and thereby limit the proportion of hot and cold water mixed by the valve to control the temperature of the mixed water emitted through the valve.

31 Claims, 3 Drawing Sheets

MIXING VALVE WITH LIMIT STOP AND PRE-SET

BACKGROUND OF THE INVENTION

The invention relates to a mixing valve for mixing water from hot and cold water sources to control the temperature of the mixed-water output and, more particularly, to a mixing valve having a limit stop that limits the proportion of hot water to control the maximum temperature of the mixed-water output.

Mixing valves are well known and commonly used in showers to permit the user to mix water from the hot and cold-water sources to produce a combined or resultant water output at a temperature desired by the user. Mixing valves are available in many different forms. For example, such valves can include combined or separate on-off valves along with hot and cold mixing valves. Mixing valves can also be constructed for proportionally increasing both the cold-water supply and the hot-water supply to obtain the desired temperature or for maintaining the cold-water supply at a fixed supply rate and then increasing the proportion of the hot water to obtain the desired temperature.

Many shower valves are now thermostatically controlled. Such a valve contains a thermostatic element responsive to temperature change that operates to actuate a plunger or similar device to restrict the hot water when the mixed output exceeds a predetermined temperature. The thermostat can be adjusted to select the maximum temperature of the output.

Regardless of the type of mixing valve, all mixing valves have a maximum proportional contribution from the hot-water supply, which defines the maximum temperature of the output. The maximum temperature obtainable from the mixing valve is a function of the hot- and cold-water flow rates and the temperature differential between the hot and cold water. At the maximum hot-water flow rate, it is not uncommon for the resultant output flow to exceed a temperature that is comfortable for the user. Therefore, it is desirable to provide a stop that prevents the setting of the valve at a temperature greater than that comfortable to the user. Also, it is desirable to provide pre-sets that position the valve at a location in which the resultant mixed outflow will have a desired and user-specified temperature.

SUMMARY OF THE INVENTION

The invention provides a shower valve assembly for controlling the proportional mixing of water from cold and hot sources thereof to obtain mixed output water at a user-controllable temperature, the shower valve assembly comprises a mixing valve having a hot-water inlet for connection to a hot-water source, a cold-water inlet for connection to a cold-water source, a mixed-water outlet fluidly connected with the inlets, and a valve stem for controlling the proportional mixing of hot and cold water entering the valve through the inlets. The valve stem is rotatable between a cold position wherein the proportion of hot water to cold water is at a minimum and a hot position wherein the proportion of hot water to cold water is at a maximum.

A handle is mounted to and extends away from the valve stem for rotating the valve stem through a rotational range defined by the cold and hot positions.

A stop is operably connected between the handle and the valve to interfere with a portion of the handle as the handle is rotated to limit the rotational range of the handle and thereby limit the rotation of the valve stem between the hot and cold positions to control the proportional mixing of the cold and hot water, thereby controlling the temperature of water exiting the mixed-water outlet.

The rotational position of the stop is preferably adjustable within the rotational range of the valve stem, and the assembly preferably includes a second stop connected to the handle to interfere with a portion of the handle as the handle is rotated to limit the rotational range of the handle at a rotatable position different from the rotational position of the first-mentioned stop, one of the stops being a limit stop used to set the maximum range of rotation of the valve stem thereby setting the maximum temperature of the mixed output and the other of the stops being a preset used to limit the rotation of the valve stem to a position corresponding to a user-preferred temperature for the mixed output.

Other features and advantages of the invention will be apparent from the ensuing description in conjunction with the accompanying drawings.

BRIEF DESCRIPTION OF THE DRAWINGS FIGURES

DETAILED DESCRIPTION

Figure 1:
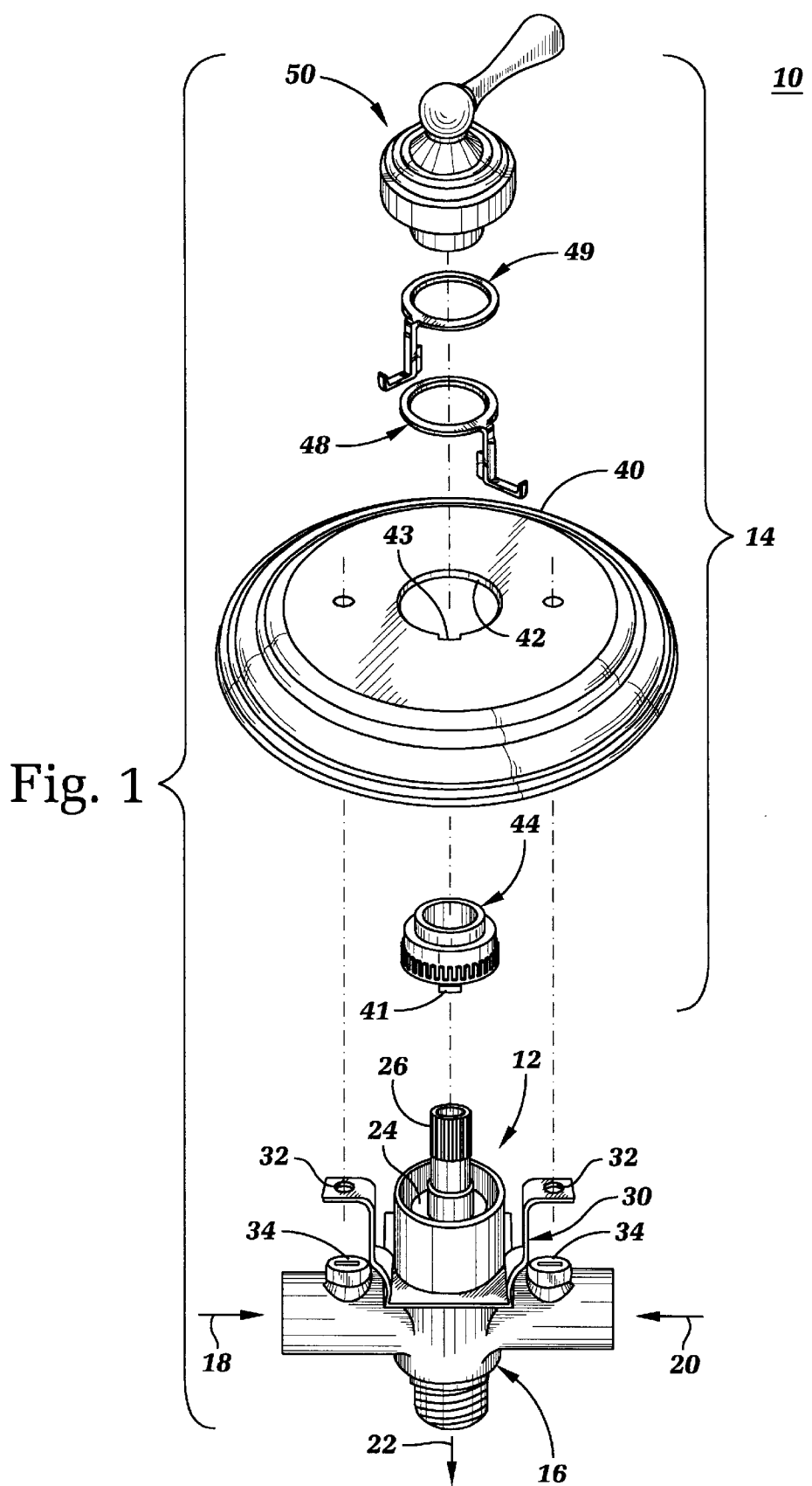
FIG. 1 is an exploded view of a mixing valve assembly with a limit stop and pre-sets according to the invention.

FIG. 1 illustrates a shower valve assembly 10 comprising a mixing valve assembly 12 and a handle assembly 14. The handle assembly 14 functions to adjust the mixing valve assembly 12 to control the ratio of hot and cold water and thereby set the temperature of the mixed output. The mixing valve assembly 12 comprises a body 16 having a hot-water inlet 18, a cold-water inlet 20, and a mixed-water outlet 22. A valve 24 having a valve stem 26 is also provided within the valve body 16 and controls the proportion of hot and cold water entering through the hot and cold-water inlets 18 and 20 where they mix and exit out the mixed outlet 22. Hot-water and cold-water shut-offs 34 are provided in the mixing valve assembly 12 to permit servicing of the valve 24.

The proportional mixing of the hot and cold water is controlled by rotating the valve stem 26 to alter the size of the opening to the hot and cold-water inlets 18, 20 and thereby control the corresponding input flow rates to control the proportion of the hot and cold water that is mixed to form the mixed output.

The valve assembly 12 further includes a handle mounting assembly comprising a mounting bracket 30 with tapped apertures 32 that receive the trim mounting screws (not shown).

It should be noted that the type of valve 24 is unimportant to the invention. The valve 24 is preferably a thermostatic valve and of the type that controls the fluid rate through the hot and cold inlets 18, 20 by controlling the effective opening size of the hot and cold inlets 18, 20. Preferably, the effective opening size for the cold inlet 20 is maximized almost immediately upon turning on the valve 24 and the temperature is regulated by continuously adjusting the effective opening size for the hot inlet 18 until the desired temperature water is emitted from the mixed outlet 22. However, the effective opening size for the hot and cold inlets 18, 20 could just as easily be opened simultaneously with the cold water having an initially faster rate of opening. It is only important to the invention that the flow of water through the hot and cold inlets 18, 20 be controlled by rotating the valve stem 26.

Figure 2:
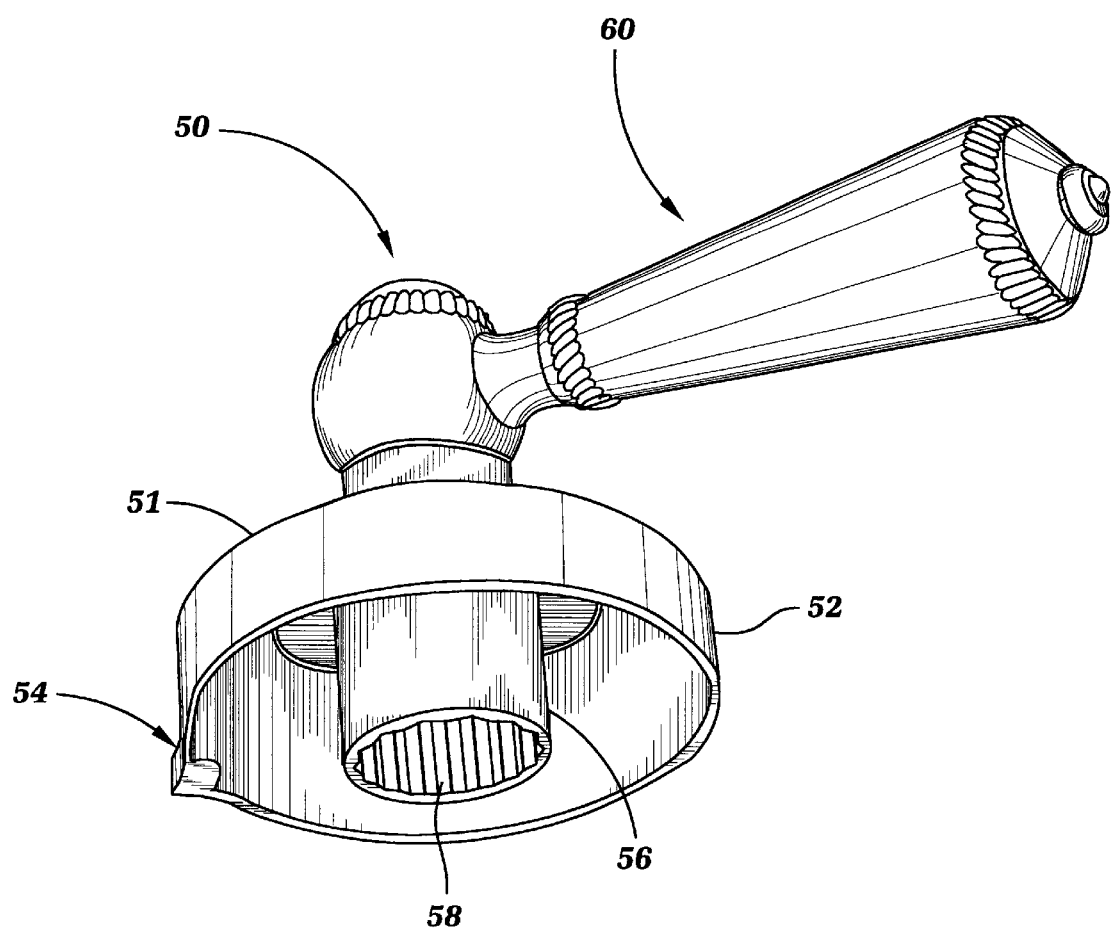
FIG. 2 is a bottom perspective view of a handle for the mixing valve assembly of FIG. 1.

The handle assembly 14 comprises a decorative cover 40 having a central opening 42 that receives a hub 44. Hub 44 includes a key 41 which fits into keyway 43 in decorative cover 40 to prevent rotation of hub 44. A limit stop 48 is positioned between the hub 44 and a handle 50 along with a pre-set 49. p Referring to FIG. 2, the handle 50 comprises a closed housing 51 terminating in an annular skirt 52 having an index 54. A socket 56 with a toothed inner surface 58 extends away from the top of the housing 51. A lever 60 extends radially away from the housing 51.

Figure 3:
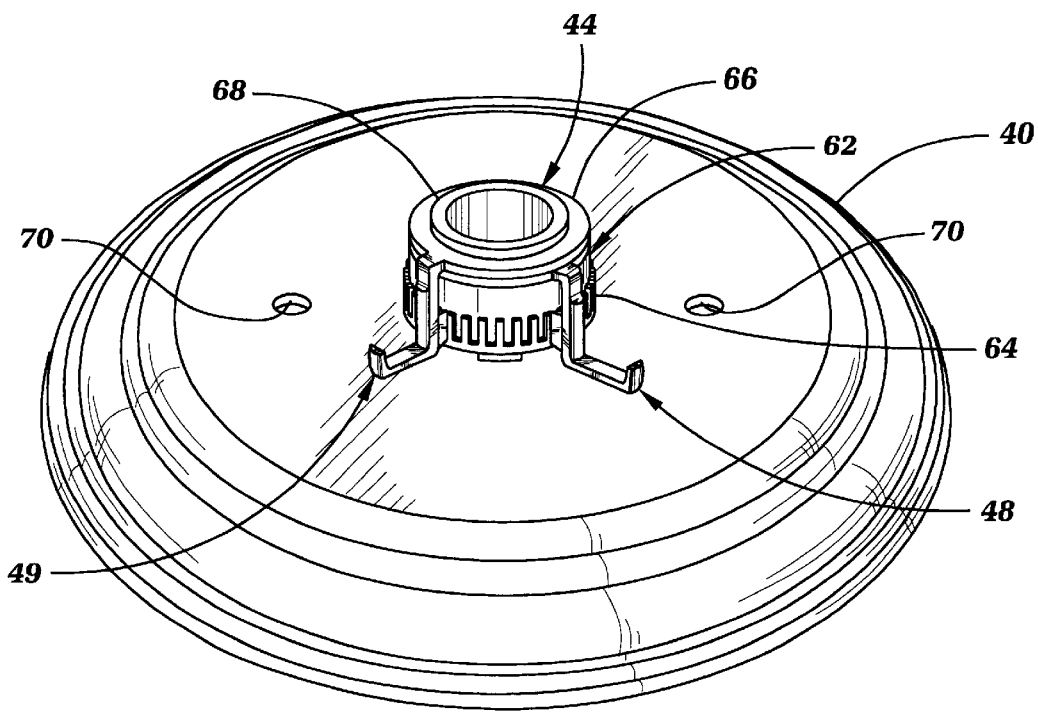
FIG. 3 is a top perspective view of a hub and limit stop of the mixing valve of FIG. 1, without the normally attached handle.

Referring to FIG. 3, the hub 44 comprises an annular body 62 extending upwardly from a lower edge. A toothed surface 64 extends around the annular body 62 at its lower edge. Adjacent pairs of teeth form detents therebetween. A shoulder 66 is formed at an upper portion of the annular body defining an annular wall 68 that extends upwardly from the shoulder 66.

Figures 4, 5:
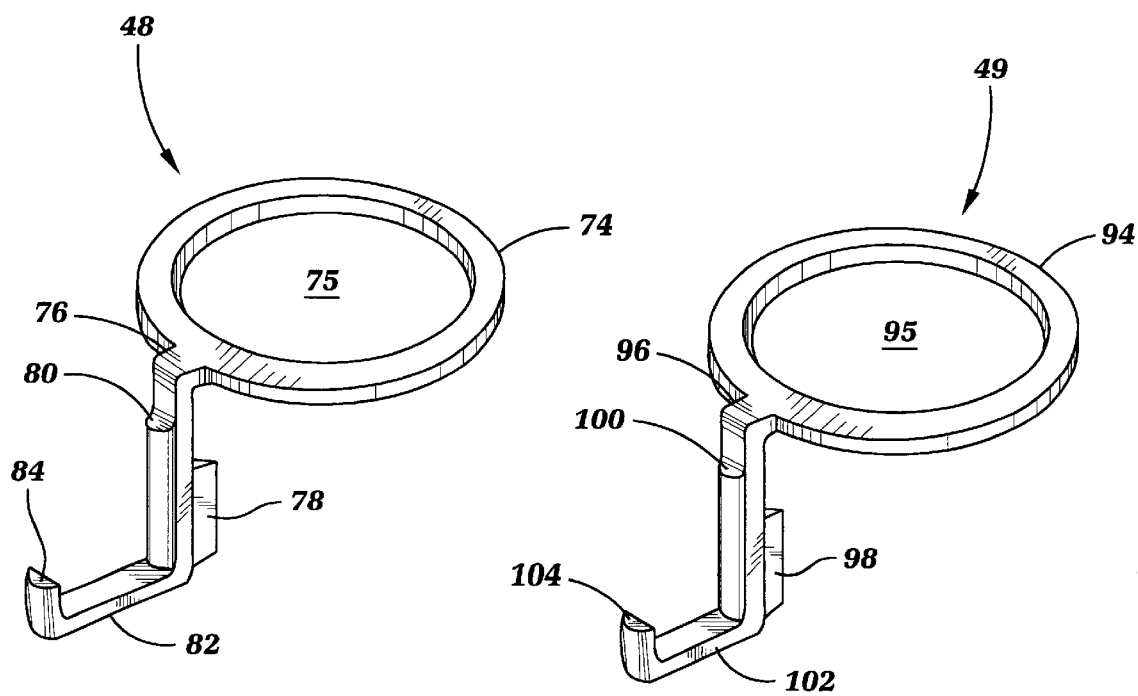
FIG. 4 is an enlarged perspective view of the limit stop of FIG. 3.
FIG. 5 is an enlarged perspective view of the pre-set of FIG. 3.

Referring to FIG. 4, the limit stop 48 comprises a collar 74 defining an inner opening 75 that is sized to receive the annular wall 68 of the hub 44. A resilient hinge 76 extends from the collar 74. A tooth or key 78 and a protrusion or stop 80 are positioned on the hinge and extend away from each other. An adjustment lever 82 extends radially outwardly from the hinge 76 and terminates in a pointer 84.

Referring to FIG. 5, the pre-set 49 is similar in shape to the limit stop 48. The pre-set 49 comprises a collar 94 defining an inner opening 95 that is sized to receive the annular wall 68 of the hub 44. A resilient hinge 96 extends from the collar 94 and has a tooth or key 98 and a stop or protrusion 100 positioned on opposite sides thereof. An adjustment lever 102 extends radially outwardly from the hinge 96 and terminates in a pointer 104.

Preferably, the pre-set hinge 96 extends slightly farther from the collar 94 than the limit stop hinge 76 extends from the collar 74. The stop 100 of the pre-set extends a shorter distance away from the hinge 96 than the stop 80 of the limit stop 48. The tooth 98 extends approximately the same or a shorter distance from the hinge 96 than the tooth 78 of the limit stop. With this construction, the stop 100 of the pre-set 49 extends a radial distance from the annular wall of the hub a distance preferably equal to or less than the radial distance that the stop 80 of the limit stop 48 extends from the annular wall 62. Additionally, the tooth 98 is not completely engaged between a corresponding set of teeth on the toothed surface 64, thereby permitting the inward deflection of the hinge 96 toward the collar 94 before the tooth 98 is fully engaged.

To assemble the shower valve assembly 10, the hub 44 is slid onto the handle socket 56. A retaining ring (not shown) holds handle 50 and hub 44 together. The mounting holes in cover 40 are aligned with the mounting bracket tapped apertures 32. Bolts (not shown) are inserted through the openings on the cover 40 and are threaded into the tapped apertures 32 to attach the cover 40 to the valve 24.

After the cover 40 and backing plate 46 are assembled to the valve, the limit stop 48 is positioned on the hub 44 by resting the collar 74 on the shoulder 66 of the hub 44. In this position, the tooth 78 of the limit stop 48 is received between adjacent teeth on the toothed surface 64 of the hub 44.

The pre-set 49 is positioned on the hub 44 in a manner similar to the limit stop 48. That is, the collar 94 is placed on the shoulder 66 of the hub so that the annular wall 68 extends therethrough. In this position, the tooth 98 of the pre-set 49 is received between and is spaced slightly from adjacent teeth on the toothed surface 64 of the hub 44.

The handle 50 and hub 44 are mounted to the valve 24 by pressing the socket 56 onto the valve stem 26 so that the toothed surface 58 of the socket 56 meshes with the toothed surface of the valve stem 26. The handle is pressed downwardly until the end of the valve stem abuts the interior of the socket 56. When the handle 50 is mounted to the valve stem 26, the annular body 52 lies between the pointers 84, 94 and the stops 80, 90. The index 54 extends inwardly a sufficient distance so that it abuts one or both of the pointer 84 and stop 80 upon rotation of the handle 50. The hub key 41 fits into keyway 43 to prevent rotation of hub 44.

In operation, the valve stem 26 is capable of rotation between a cold position and a hot position. The cold position typically coincides with the lowest proportion of hot water to cold water obtainable through the valve. The hot position typically corresponds to the highest proportion of hot water to cold water obtainable from the valve. For a thermostatic valve the hot position is controlled by the thermostat. These positions are generally associated with the effective opening of the cold and hot-water inlets being at their minimum or maximum as appropriate.

The valve stem is rotated by rotating the lever to thereby move the valve stem between the cold and hot positions as desired by the user. The range of the handle coincides with the range of the valve stem except as limited by the limit stop 48. As the handle 60 is rotated, the index 54 first contacts the stop 100 on the pre-set 49, which provides the user with a mechanical feed back that the preset has been reached. The continual rotation of the handle 60 deflects the hinge 96 inwardly toward the hub 44, permitting the index 54 to rotate past the pre-set 49. Ultimately, the rotation of the handle will bring the index 54 into contact with the stop 80, preventing the further rotation of the handle.

The limit stop and pre-set can both be adjusted by the user grasping the pointer 84, 94 and pulling outwardly to deflect the hinge 76, 96 and release the tooth 78, 98 from positive engagement with the toothed surface 64 of the collar 44. The user can then rotate the limit stop 48 or preset 49 to the desired position and release the pointer, whereby the tooth 78, 98 engages the toothed surface 64 at a new location.

The preferred manner of setting the pre-set limit stop 49 and 48 is to begin with the pre-set and limit stop in the position that coincides with the hot position of the valve. The user can then rotate the valve stem 50 by the lever 60 until the desired pre-set water output temperature is reached. The user then rotates the pre-set as described above until the stop 80 abuts the index 54 on the handle 50. The steps are repeated for the limit stop.

Although described in terms of a single pre-set and a single limit stop, the invention can comprise a plurality of pre-sets along with the limit stop. The pre-sets can have various configurations other than described in the specification. For example, instead of extending the length of the hinge 96, the hinge 96 of the pre-set could be canted at an angle extending away from the hub 44 and the stop 80 can be adjusted in size or eliminated as needed to affect the necessary contact between the index 54 and the pre-set 49, but still permit the deflection of the hinge 96 a sufficient distance to permit the index 54 to be rotated past the hinge 96.

It should be noted that the limit stop and pre-set both function to "stop" the rotation of the handle and, thus, limit the rotation of the valve stem to control the output temperature. The pre-set and limit stop differ in that the pre-set does not prohibit the continued rotation of the handle, but the limit stop does.

Although shown as a mechanical device, the pre-set could comprise an electrical device that provided a signal, visual and/or audio, when the pre-set is reached.

The invention provides a simple and effective solution to the problem of limiting the maximum temperature output of a shower valve assembly to prevent scalding. Additionally, the invention can also be used to set one or more temperature pre-sets that are associated with a particular user, permitting each user to quickly adjust the shower to their desired location.

Having described the invention, what is claimed is:

1. A shower valve assembly for controlling the proportional mixing of water from cold and hot sources thereof to obtain mixed output water at a user-controllable temperature, the shower valve assembly comprising:

a mixing valve having a hot-water inlet for connection to a hot-water source, a cold-water inlet for connection to a cold-water source, a mixed-water outlet fluidly connected with the inlets, and a valve stem for controlling the proportional mixing of hot and cold water entering the valve through the inlets and rotatable between a cold position wherein the proportion of hot water to cold water is at a minimum and a hot position wherein the proportion of hot water to cold water is at a maximum;

a handle mounted to and extending away from the valve stem for rotating the valve stem through a rotational range defined by the cold and hot positions;

a stop operably connected between the handle and the valve to interfere with a portion of the handle as the handle is rotated to limit the rotational range of the handle and thereby limit the rotation of the valve stem between the hot and cold positions to control the proportional mixing of the cold and hot water, thereby controlling the temperature of water exiting the mixed-water outlet, the stop having a rotational position that is adjustable within the rotational range of the valve stem; and a latch having a plurality of detents, each of which is adapted to receive the stop to discretely adjust its rotational position.

2. A shower valve assembly according to claim 1, including a second stop connected to the handle to interfere with a portion of the handle as the handle is rotated to limit the rotational range of the handle at a rotatable position different from the rotational position of the first-mentioned stop.

3. A shower valve assembly according to claim 2, wherein one of the stops is a limit stop used to set the maximum range of rotation of the valve stem thereby setting the maximum temperature of the mixed output and the other of the stops is a pre-set used to limit the rotation of the valve stem to a position corresponding to a user-preferred temperature for the mixed output.

4. A shower valve assembly according to claim 1, including a hub fixedly mounted relative to the valve stem and having a series of teeth, adjacent pairs of the teeth defining the detents, the stop being rotatably mounted to the hub and including a tooth that is sized to be received within any one of the detents.

5. A shower valve assembly for controlling the proportional mixing of water from cold and hot sources thereof to obtain mixed output water at a user-controllable temperature, the shower valve assembly comprising:

a mixing valve having a hot-water inlet for connection to a hot-water source, a cold-water inlet for connection to a cold-water source, a mixed-water outlet fluidly connected with the inlets, and a valve stem for controlling the proportional mixing of hot and cold water entering the valve through the inlets and rotatable between a cold position wherein the proportion of hot water to cold water is at a minimum and a hot position wherein the proportion of hot water to cold water is at a maximum;

a handle mounted to and extending away from the valve stem for rotating the valve stem through a rotational range defined by the cold and hot positions; and a stop operably connected between the handle and the valve to interfere with a portion of the handle as the handle is rotated to limit the rotational range of the handle and thereby limit the rotation of the valve stem between the hot and cold positions to control the proportional mixing of the cold and hot water, thereby controlling the temperature of water exiting the mixed-water outlet, the stop having a rotational position that is adjustable within the rotational range of the valve stem; wherein the handle includes an index and the stop comprises a protrusion that lies in the rotational path of the index, whereby upon rotation of the handle the index will abut the protrusion to interfere with further rotation of the handle.

6. A shower valve assembly for controlling the proportional mixing of water from cold and hot sources thereof to obtain mixed output water at a user-controllable temperature, the shower valve assembly comprising:

a mixing valve having a hot-water inlet for connection to a hot-water source, a cold-water inlet for connection to a cold-water source, a mixed-water outlet fluidly connected with the inlets, and a valve stem for controlling the proportional mixing of hot and cold water entering the valve through the inlets and rotatable between a cold position wherein the proportion of hot water to cold water is at a minimum and a hot position wherein the proportion of hot water to cold water is at a maximum;

a handle mounted to and extending away from the valve stem for rotating the valve stem through a rotational range defined by the cold and hot positions;

a stop operably connected between the handle and the valve to interfere with a portion of the handle as the handle is rotated to limit the rotational range of the handle and thereby limit the rotation of the valve stem between the hot and cold positions to control the proportional mixing of the cold and hot water, thereby controlling the temperature of water exiting the mixed-water outlet, the stop having a rotational position that is adjustable within the rotational range of the valve stem; and an annular hub fixedly mounted relative to and circumscribing the stem, the stop comprising a collar circumscribing a portion of the hub to rotatably mount the stop to the hub and a protrusion extending into the rotational path of the handle, the protrusion is rotatably adjustable by rotating the collar relative to the hub, and upon rotation of the handle, the protrusion will abut a portion thereof to interfere with further rotation of the handle.

7. A shower valve assembly according to claim 6, wherein the hub comprises a plurality of teeth disposed about the exterior of the hub and the stop includes a pivotable hinge extending from the collar and a key carried by the hinge and sized to be received between adjacent teeth on the hub, whereby the rotational position of the stop relative to the hub is adjustable by pivoting the hinge in one direction to withdraw the key from between a first pair of adjacent teeth, rotating the collar relative to the hub, and pivoting the key in a direction opposite to said one direction to be received between a second pair of adjacent teeth on the hub.

8. A shower valve assembly according to claim 7, wherein the hinge, the protrusion, and the key are so configured that the protrusion is deflectable inwardly toward the hub out of the path of the index upon continued rotation of the handle.

9. A shower valve assembly according to claim 7, wherein the protrusion is carried by the hinge on a side opposite the key and the key is resiliently biased toward the hub by the hinge.

10. A shower valve assembly according to claim 9, wherein the stop includes a pointer extending from the hinge and spaced from the protrusion, and the handle comprises an annular skirt positioned between the protrusion and the pointer, with an index extending from the skirt into the rotational path of the protrusion, whereby upon the rotation of the handle the protrusion abuts the index to interfere with the rotation of the handle.

11. A shower valve assembly according to claim 9, wherein the hinge, the protrusion, and the key are so configured that the protrusion is prevented from being deflected inwardly toward the hub out of the path of the index to prevent the rotation of the handle.

12. A stop for a mixing valve assembly for controlling the proportional mixing of water from cold and hot sources thereof to obtain mixed output water at a user-controllable temperature, the mixing valve assembly comprising a mixing valve having a valve stem and a handle fixedly mounted to the valve stem for rotation between a cold position wherein the proportion of hot water to cold water is at a minimum and a hot position wherein the proportion of hot water to cold water is at a maximum, the stop comprising:

a protrusion adapted to extend into the rotational path of a portion of the handle and to be rotatably adjusted between the hot and cold positions of the valve stem such that the protrusion is adapted to abut a portion of the handle to prevent unobstructed rotation of the handle; and a hub adapted to circumscribe a portion of the valve stem and a collar adapted to circumscribe a portion of the hub to rotatably mount the stop to the hub the protrusion is rotatably adjustable by rotating the collar relative to the hub.

13. A stop according to claim 12, wherein the stop is a limit stop used to set the maximum range of rotation of the valve stem thereby setting the maximum temperature of the mixed output.

14. A stop according to claim 12, wherein the stop is a pre-set used to limit the rotation of the valve stem to a position corresponding to a user preferred temperature for the mixed output.

15. A stop according to claim 12, wherein the hub comprises a plurality of teeth disposed about the exterior of the hub and the stop includes a pivotable hinge extending from the collar and a key carried by the hinge and sized to be received between adjacent teeth on the hub, whereby the rotational position of the stop relative to the hub is adjustable by pivoting the hinge in one direction to withdraw the key from between a first pair of adjacent teeth, rotating the collar relative to the hub, and pivoting the key in a direction opposite to said one direction to be received between a second pair of adjacent teeth on the hub.

16. A stop according to claim 15, wherein the hinge, the protrusion, and the key are so configured that the protrusion is deflectable inwardly toward the hub out of the path of the index upon continued rotation of the handle.

17. A mixing valve assembly for controlling the proportional mixing of water from cold and hot sources thereof to obtain mixed output water at a user-controllable temperature, the mixing valve assembly comprising:

a mixing valve having a valve stem and a handle fixedly mounted to the valve stem for rotation between a cold position wherein the proportion of hot water to cold water is at a minimum and a hot position wherein the proportion of hot water to cold water is at a maximum; and a stop operably connected between the handle and the valve to interfere with a portion of the handle as the handle is rotated to limit the rotational range of the handle and thereby limit the rotation of the valve stem between the hot and cold positions to control the proportional mixing of the cold and hot water, thereby controlling the temperature of the mixed output water; and an annular hub fixedly mounted relative to and circumscribing the stem, the stop comprising a collar circumscribing a portion of the hub to rotatably mount the stop to the hub and a protrusion extending into the rotational path of the handle, whereby the protrusion is rotatably adjustable by rotating the collar relative to the hub, and upon rotation of the handle, the protrusion will abut a portion thereof to interfere with further rotation of the handle.

18. A mixing valve assembly according to claim 17, wherein the stop is rotatably adjustable within the rotational range of the valve stem.

19. A mixing valve assembly according to claim 18, and further comprising a second stop connected to the handle to interfere with a portion of the handle as the handle is rotated to limit the rotational range of the handle at a rotatable position different from the rotatable position of the first-mentioned stop.

20. A mixing valve assembly according to claim 19, wherein one of the stops is a limit stop used to set the maximum range of rotation of the valve stem thereby setting the maximum temperature of the mixed output and the other of the stops is a pre-set used to limit the rotation of the valve stem to a rotational position less than the limit stop to define a user-preferred temperature for the mixed output.

21. A mixing valve assembly according to claim 17, wherein the hub comprises a plurality of teeth disposed about the exterior of the hub and the stop includes a pivotable hinge extending from the collar and a key carried by the hinge and sized to be received between adjacent teeth on the hub, whereby the rotational position of the stop relative to the hub is adjustable by pivoting the hinge in one direction to withdraw the key from between a first pair of adjacent teeth, rotating the collar relative to the hub, and pivoting the key in a direction opposite to said one direction to be received between a second pair of adjacent teeth on the hub.

22. A mixing valve assembly according to claim 21, wherein the protrusion is carried by the hinge on a side opposite the key and the key is resiliently biased toward the hub by the hinge.

23. A mixing valve assembly according to claim 22, wherein the hinge, the protrusion, and the key are so configured that the protrusion is deflectable inwardly toward the hub out of the path of the index upon continued rotation of the handle.

24. A shower valve assembly for controlling the proportional mixing of water from cold and hot sources thereof to obtain mixed output water at a user-controllable temperature, the shower valve assembly comprising:

a mixing valve having a hot-water inlet for connection to a hot-water source, a cold-water inlet for connection to a cold-water source, a mixed-water outlet fluidly connected with the inlets, and a valve stem for controlling the proportional mixing of hot and cold water entering the valve through the inlets and rotatable between a cold position wherein the proportion of hot water to cold water is at a minimum and a hot position wherein the proportion of hot water to cold water is at a maximum;

an annular hub fixed relative to and circumscribing the stem and having a plurality of teeth disposed about the exterior of the hub;

a handle mounted to and extending away from the valve stem for rotating the valve stem through a rotational range defined by the cold and hot positions and having an index radially spaced from the teeth of the hub;

a limit stop comprising a collar circumscribing a portion of the hub to rotatably mount the limit stop to the hub, a resilient hinge extending from the collar, a key carried by the hinge and extending radially between the teeth of the hub to fix the rotational position of the limit stop relative to the hub, and a protrusion carried by the hinge and extending into the rotational path of the handle index to limit the rotation of the handle relative to the hub, whereby the rotational range of the handle is limited by contact between the handle index and the limit stop protrusion to thereby limit the rotational range of the handle to a maximum position that is rotationally less than or equal to the valve stem hot position to control the maximum temperature of water exiting the mixed-water outlet; and a pre-set stop comprising a collar circumscribing a portion of the hub to rotatably mount the pre-set stop to the hub, a resilient hinge extending from the collar, a key carried by the hinge and extending radially between the teeth of the hub to fix the rotational position of the pre-set stop relative to the hub, and a protrusion carried by the hinge and extending into the rotational path of the handle index to limit the rotation of the handle relative to the hub, whereby the rotational range of the handle is limited by contact between the handle index and the limit stop protrusion to thereby limit the rotational range of the handle to a pre-set position that is rotationally less than or equal to the limit stop maximum position;

wherein the limit stop hinge, protrusion, and key are so configured that the limit-stop protrusion cannot be deflected inwardly toward the hub out of the path of the index to prevent the rotation of the handle past the limit stop protrusion, and the pre-set stop hinge, protrusion, and key are so configured that the pre-set protrusion can be deflected inwardly toward the hub out of the path of the index to enable the rotation of the handle past the pre-set.

25. A shower valve assembly according to claim 24, wherein the limit stop hinge can be deflected radially away from the hub a sufficient amount to remove the limit stop key from between adjacent pairs of teeth on the hub to permit the rotation of the limit stop to a new rotational position and the resilient hinge biases the limit stop key between a different pair of hub teeth to define a new maximum position.

26. A shower valve assembly according to claim 25, wherein the limit stop includes a pointer extending from the limit stop hinge and spaced from the limit stop protrusion, and the handle comprises an annular skirt positioned between the limit stop protrusion and the pointer, and the index extends from the skirt into the rotational path of the limit stop protrusion whereby upon the rotational of the handle the limit stop protrusion abuts the index to interfere with the rotation of the handle.

27. A valve assembly for controlling proportional mixing of water from cold and hot sources to obtain mixed output water at a user-controllable temperature, the valve assembly comprising:

a hot and cold water mixing valve assembly including a rotatable valve stem for controlling the proportional mixing of hot and cold water;

a handle assembly having a portion configured to engage the valve stem and rotate along a rotation path, thereby rotating the stem through a rotational range defined between a maximum cold position and a maximum hot position;

a cover assembly substantially covering and thereby substantially concealing the mixing valve assembly; and a stop member moveable along the rotation path and having a first portion configured to be releasably retained at at least one stop receiving location along the rotation path between the maximum cold and hot positions and a second portion configured to engage a portion of the handle assembly and thereby prevent rotation of the handle assembly beyond a stop limit defined by the retained stop member, the stop member having at least a portion thereof extending beyond the cover assembly such that a user can engage the extending portion to move the stop member first portion to a desired stop receiving location to define a desired stop limit.

28. The valve assembly of claim 27 wherein the cover assembly includes an annular skirt portion of the handle assembly.

29. The valve assembly of claim 28 wherein the cover assembly further includes a holed cover plate positioned about the mixing valve assembly and the stop member extending portion extends between the holed cover and the annular skirt.

30. The valve assembly of claim 27 wherein a plurality of stop receiving locations are defined along a cylindrical hub fixedly positioned about the valve mixing assembly.

31. The valve assembly of claim 30 wherein the cover assembly includes a holed cover plate positional about the valve mixing assembly, the cover plate including a notch configured to receive a key extending from the hub to thereby rotationally fix the hub.

* * * * *